United States Patent [19]
Aoyama et al.

[11] Patent Number: 5,397,094
[45] Date of Patent: Mar. 14, 1995

[54] SADDLE SUPPORTING DEVICE

[75] Inventors: Tadao Aoyama, Fukushima; Tetsuo Yasumaru, Kanagawa; Masayuki Saito, Fukushima, all of Japan

[73] Assignee: Tokico, Ltd., Kanagawa, Japan

[21] Appl. No.: 996,175

[22] Filed: Dec. 23, 1992

[30] Foreign Application Priority Data

| Dec. 27, 1991 | [JP] | Japan | 3-360561 |
| Mar. 5, 1992 | [JP] | Japan | 4-083279 |
| Oct. 30, 1992 | [JP] | Japan | 4-316280 |

[51] Int. Cl.⁶ .......................................... F16M 13/00
[52] U.S. Cl. .............................. 248/598; 280/281.1; 297/328
[58] Field of Search .............. 248/618, 596, 599, 600, 248/601, 598, 585; 297/328; 280/281.1

[56] References Cited

U.S. PATENT DOCUMENTS

| 448,969 | 3/1891 | Lloyd | 248/585 X |
| 568,977 | 10/1896 | Helmore | 248/596 X |
| 979,483 | 12/1910 | Harley | 248/598 X |
| 1,044,272 | 11/1912 | Shepherd | 248/585 X |
| 1,100,652 | 6/1914 | Brooks | 248/585 X |
| 1,128,735 | 2/1915 | Troxel | . |
| 2,167,912 | 8/1939 | Schwinn | . |
| 3,627,252 | 12/1971 | Yamaguchi | 297/328 X |
| 3,788,587 | 1/1974 | Stemmier | 248/599 X |
| 3,921,952 | 11/1975 | Wirges | 248/599 X |
| 5,029,888 | 7/1991 | Alsop | 280/281.1 |

FOREIGN PATENT DOCUMENTS

| 833455 | 3/1952 | Germany | . |
| 7801356 | 3/1979 | Germany | . |
| 470629 | 8/1937 | United Kingdom | 248/596 |

*Primary Examiner*—J. Franklin Foss
*Attorney, Agent, or Firm*—Wenderoth, Lind & Ponack

[57] ABSTRACT

A device for supporting a saddle of a bicycle, a mountain bike, etc., which includes a support frame, a guide tube secured to the support frame, and a tubular support member upwardly biased by a spring means. The projecting end portion of the tubular support member is connected to a mounting member for the saddle so that the support member and the saddle mounting member are movable relative to each other in a direction transverse to the longitudinal axis of the support member. The saddle mounting member is swingably connected to the guide tube.

11 Claims, 3 Drawing Sheets

SADDLE SUPPORTING DEVICE

BACKGROUND OF THE INVENTION

1. Field of the Invention

The present invention relates to a device for supporting a saddle. More particularly, the present invention relates to a saddle supporting device which may be suitably used for supporting a saddle of the bicycle, a mountain bike, etc.

2. Description of the Prior Art

Hitherto, a saddle of a bicycle, a mountain bike, or the like was attached to a support frame (main frame) through a seat post serving as a rigid member, and shock absorption was effected mainly by the action of a metallic spring provided under the saddle, and the tires. However, the conventional saddle supporting structure, which employs the seat post as a rigid member, cannot provide a sufficient shock absorbing capacity for some types of bicycle, e.g., those which are required to provide soft cushioning, or those which are subjected to large impacts, such as mountain bikes. Accordingly, the prior art cannot provide a satisfactory ride quality and necessitates the support frame to be formed so as to have high strength in order to endure large impacts.

Under these circumstances, the present inventors have already developed and disclosed in Japanese Patent Application Number 3-232397 (1991) a saddle supporting device wherein a damper is slidably fitted in a guide tube secured to a support frame. An end portion of a piston rod of the damper is secured to the bottom of the guide tube, and a mounting member for a saddle is connected to a casing of the damper, which projects from the guide tube. With this supporting device, a shock that is applied to a wheel is transmitted to the saddle through the damper. Therefore, shocks are absorbed effectively over a wide range, so that the above-described problems can be overcome.

The above-described saddle supporting device, which includes the damper, suffers, however, from the following problems. In a case where the guide tube that slidably guides the damper is disposed with an inclination with respect to the vertical direction, external force is applied from the saddle to the damper in a direction different from the axial direction of the damper, which may cause sticking at the area of sliding contact between the damper (damper casing) and the guide tube, resulting in an unsmooth action of the damper. Further, in the above-described saddle supporting device, a means for preventing relative rotation between the guide tube and the damper is disposed in the guide tube. Therefore, the structure becomes complicated, inviting an increase in the cost.

SUMMARY OF THE INVENTION

In view of the above-described problems of the prior art, it is an object of the present invention to provide a saddle supporting device which is designed so that a smooth damper action is ensured, and the structure is simplified.

To this end, according to a first aspect of the present invention, there is provided a device for supporting a saddle on a support frame of a vehicle. The device includes a guide tube secured to the support frame, a tubular support member mounted in the guide tube for axial sliding movement, a spring means disposed between the guide tube and the tubular support member for resiliently supporting the tubular support member so that one end of the support member extends from the guide member and a saddle mounting member connected to the end of the tubular support member so that a limited relative movement between the saddle mounting member and the tubular support member is permitted in a direction generally parallel to the fore and aft direction of the saddle which is transverse to the axis of the tubular support member, a bearing arm formed integrally with the guide tube so as to extend in a fore and aft direction of the saddle and a swing arm formed integrally with the saddle mounting member so as to extend in a fore and aft direction of the saddle and having a forward end pivotally connected to the bearing arm.

According to a second aspect of the invention, the above-described swing arm is replaced with two parallel links, each of which has opposite ends connected to a forward portion of the bearing arm and the saddle mounting member, respectively. The line connecting the points of pivotal connection between the two links and the forward portion of the bearing arm is parallel with the line connecting the points of pivotal connection between the two links and the saddle mounting member so as to form a parallelogram link mechanism.

According to the first aspect of the present invention, the saddle mounting member swings, together with the swing arm, about the pivot point where the swing arm is pivotably attached to the bearing arm. Therefore, force acting along the axis of the tubular support member is created at the point of connection between the saddle mounting member and the tubular support member. Accordingly, there is no likelihood of sticking occurring at the area of sliding contact between the tubular support member and the guide tube. In addition, since relative rotation between the guide tube and the tubular support member is prevented by the cooperation of the bearing arm and the swing arm of the saddle, it becomes unnecessary to provide a special rotation preventing means in the guide tube.

According to the second aspect of the present invention, the saddle, including the saddle mounting member, is allowed to move parallel to the axis of the tubular support member by the action of the parallelogram link mechanism. Accordingly, there is no likelihood of sticking occurring at the area of sliding contact between the tubular support member and the guide tube. In addition, the saddle is prevented from rotating and is maintained in a predetermined posture.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS:

Embodiments of the present invention will be described below in detail with reference to the accompanying drawings.

Figure 1:
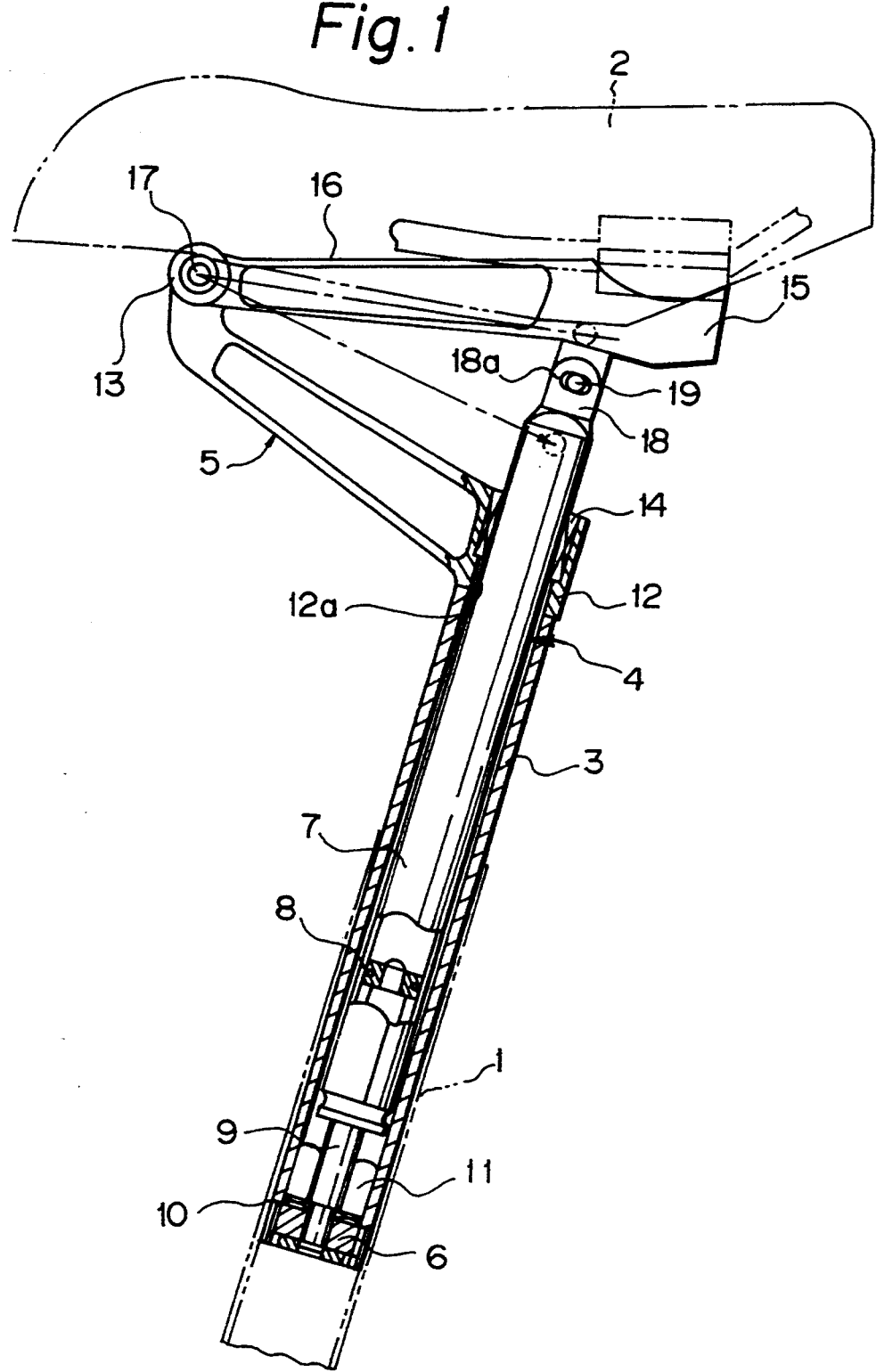
FIG. 1 is a partly-sectioned side view of a first embodiment of the saddle supporting device according to the present invention.

Referring to FIG. 1, which shows a first embodiment of the present invention, a main frame post 1 of a bicycle is disposed with an inclination with respect to the vertical direction. A saddle 2 of the bicycle is supported by the main frame post 1 through a guide tube 3, a spring means 4, and a bearing arm 5. The spring means 4 in this embodiment takes the form of a damper with a damping force generating mechanism. The guide tube 3 is fitted in the hollow inside of the main frame post 1 and secured thereto by a fixing member (not shown), e.g., a bolt, as is generally known with conventional bicycles. In addition, a cap 6 is secured by a suitable means to an opening end portion of the guide tube 3 at a side thereof which is inserted into the main frame post 1. The damper 4 has a tubular casing 7, a piston 8 that is slidably fitted in the casing 7, and a piston rod 9 that is extended from the piston 8 through a rod guide (not shown). The distal end portion of the piston rod 9 is secured to the cap 6 in such a manner that at least axial displacement of the piston rod 9 is prevented.

The damper 4 is arranged such that the casing 7 is axially movable inside the guide tube 3 with the piston 8 fixed in position. In this embodiment, the damper 4 is arranged in the form of a gas-filled hydraulic damper wherein a gas is sealed in an upper chamber, which is defined above the piston 8, while oil flows through an orifice (not shown) provided in the piston 8. In addition, an elastic member 11 is provided in the guide tube 3 so as to rest on the cap 6 through a support plate 10, so that when the casing 7 moves a substantial amount, it collides with the elastic member 11, thereby relieving the shock.

The bearing arm 5 has a large end portion 12 and a small end portion 13. The large end portion 12 has a stepped bore 12a, while the small end portion 13 has a bore (not shown) of small diameter which extends in a direction transverse to the longitudinal axis of the stepped bore 12a. The large end portion 12 is bonded to the guide tube 3 by welding, for example, thereby uniting them together. The large end portion 12 of the bearing arm 5 is positioned so that the stepped bore 12a is concentric with the guide tube 3, and a sleeve 14 is fitted in the stepped bore 12a for slidably guiding the casing 7 of the damper 4. The saddle 2 has a mounting member 15 therefor, and a swing arm 16 extends from the saddle mounting member 15 as an integral part of the latter. The distal end portion of the swing arm 16 is pivotably attached to the small end portion 13 of the bearing arm 5 by using a first pin 17. On the other hand, the saddle mounting member 15 is pivotably attached to a bracket 18, which projects from the upper end of the casing 7 of the damper 4, by using a second pin 19. A pin bore 18a that is provided in the bracket 18 for receiving the second pin 19 is elongated in a direction transverse to the longitudinal axis of the damper 4. Thus, the casing 7 of the damper 4 and the saddle mounting member 15 are movable relative to each other in the direction transverse to the axis of the damper 4, generally in the fore and aft direction of the saddle. Consequently, the saddle mounting member 15 can swing over a predetermined angular range about the first pin 17, together with the swing arm 16, as shown by the chain lines in the figure.

The function of the saddle supporting device, arranged as described above, will be explained below.

When no one is seated on the saddle 2, the damper 4 is in an extended position. If the user is seated on the saddle 2 in this state, the saddle mounting member 15 pivots about the first pin 17, together with the swing arm 16, causing the casing 7 of the damper 4 to lower. At this time, the second pin 19 moves transversely within the pin bore 18a in the bracket 18, ensuring the pivotal movement of the swing arm 16, and thus, the saddle mounting member 15. Thus, the pivotal movement of the saddle mounting member 15 causes the second pin 19 to exert a force in a direction parallel to the axis of the damper 4, and no transverse force is transmitted to the casing 7 of the damper 4. Accordingly, the casing 7 lowers smoothly, and no sticking occurs between the casing 7 and the sleeve 14. It should be noted that when the casing 7 lowers, the piston 8 moves upwardly relative to the casing 7, so that the oil flows through the orifice (not shown) provided in the piston 8, and the gas functioning as a spring in the damper 4 is compressed. Thus, the casing 7 lowers to a position where the applied load balances with the pressure of the compressed gas, and the saddle 2 is held in the equilibrium position. Consequently, the user of the bicycle can enjoy comfortable riding.

When a large impact is applied to a wheel, the saddle mounting member 15 further pivots about the first pin 17, together with the swing arm 16, so that the casing 7 further lowers, destroying the above-described equilibrium. Consequently, the gas is compressed to a substantial degree, thus providing a cushioning effect. At this time, the oil in the upper chamber, which is defined above the piston 8, passes through the orifice in the piston 8 at a high speed and enters the lower chamber, which is defined below the piston 8, thereby producing a damping force as well. Accordingly, even when a large impact is applied, a favorable ride quality is ensured. Moreover, since the bearing arm 5 and the swing arm 16 of the saddle 2 cooperate with each other to prevent relative rotation between the guide tube 3 and the casing 7 of the damper 4, the saddle 2 will not rotate undesirably, and there is no likelihood that steering stability will be impaired by an impact.

Although in the above-described first embodiment the pin bore (elongated bore) 18a for receiving the second pin 19, which connects together the casing 7 of the damper 4 and the saddle mounting member 15, is provided in the bracket 18 extending from the casing 7, it should be noted that the pin bore 18a may be provided in a portion of the saddle mounting member 15, as a matter of course.

Figure 2:
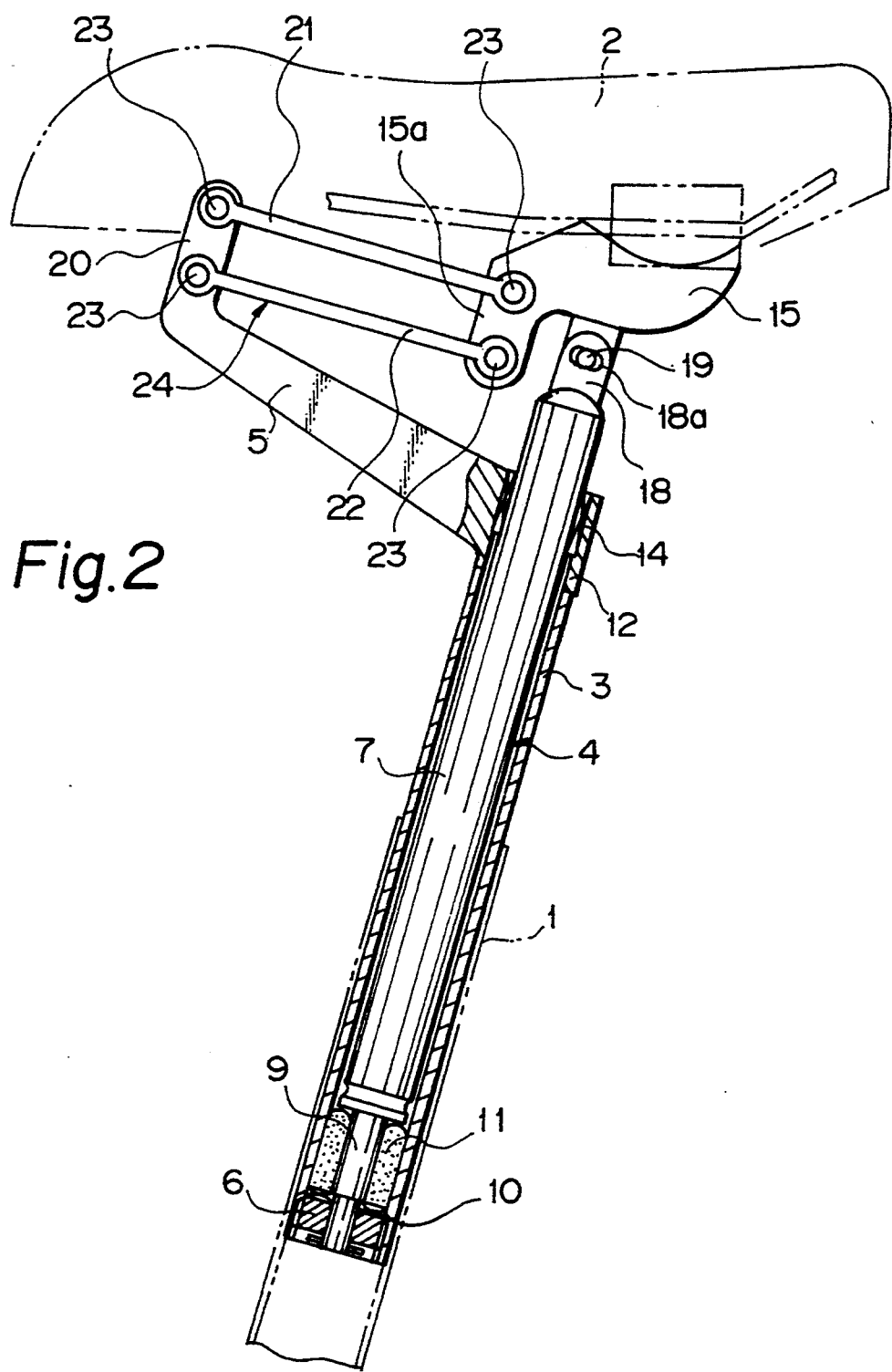
FIG. 2 is a partly-sectioned side view of a second embodiment of the saddle supporting device according to the present invention.

FIG. 2 shows a second embodiment of the present invention. Since the basic structure of the second embodiment is the same as that of the first embodiment, the same members or portions as those shown in FIG. 1 are denoted by the same reference numerals, and only the portions in which the second embodiment differs from the first embodiment will be explained below. The feature of the second embodiment resides in that the swing arm 16 in the first embodiment is replaced with two links. That is, a bent portion 20, which extends in the axial direction of the damper 4, is provided on the distal end portion of the bearing arm 5 in place of the small end portion 17 (see FIG. 1), and another bent portion 15a, which also extends in the axial direction of the damper 4, is provided on the saddle mounting member 15. Further, two links 21 and 22 extend between the two bent portions 20 and 15a. The two links 21 and 22 extend parallel to each other, and the respective ends of the links 21 and 22 are pivotably attached to the bent portions 20 and 15a by using pins 23. The imaginary line connecting the pivot points (i.e., the centers of the pins 23), at which the respective ends of the two links 21 and 22 are pivotably attached to each of the bent portions 20 and 15a, extends parallel to the axis of the damper 4. Thus, the two bent portions 20 and 15a and the two links 21 and 22 cooperate with each other to form a parallelogram link mechanism 24, which performs a parallel crank motion with the bent portion 20 of the bearing arm 5 used as a fixed link.

In the second embodiment, arranged as described above, the parallelogram link mechanism 24 enables the saddle 2, including the saddle mounting member 15, to move parallel to the axis of the damper 4. Accordingly, the casing 7 of the damper 4 moves smoothly in the same way as in the first embodiment. Moreover, the saddle 2 is prevented from rotating and is maintained in a predetermined posture.

Figure 3:
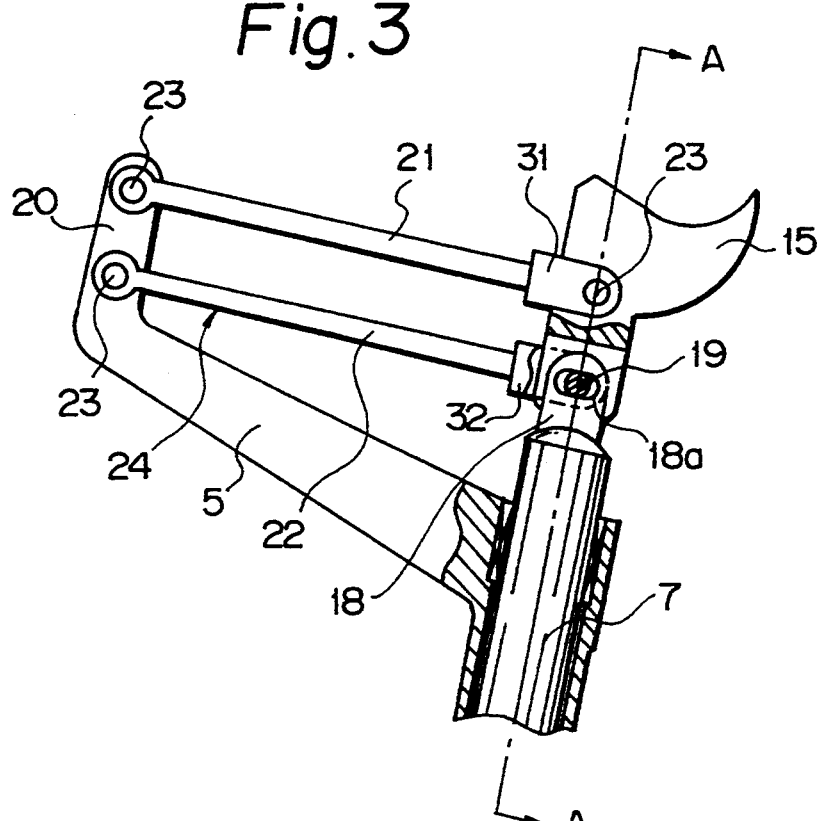
FIG. 3 is a partly-sectioned side view of a third embodiment of the saddle supporting device according to the present invention.
Figure 4:
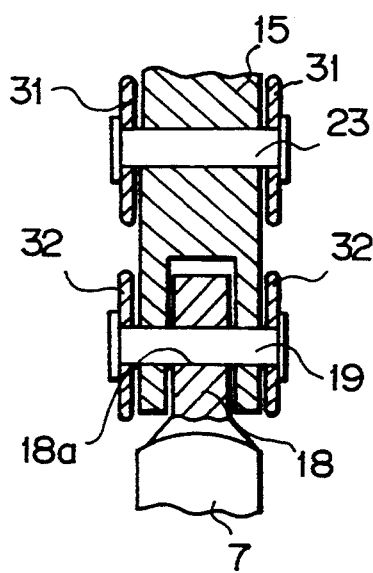
FIG. 4 is a sectional view taken along the line A—A in FIG. 3.

FIGS. 3 and 4 show a third embodiment of the present invention. The third embodiment is a modification of the above-described second embodiment. The feature of the third embodiment resides in that the bent portion 15a of the saddle mounting member 15 in the second embodiment is removed, and instead two forked connecting portions 31 and 32 are provided integrally at the respective ends of the two links 21 and 22. The links 21 and 22 are connected to the saddle mounting member 15 by using the connecting portions 31 and 32 in such a manner that the saddle mounting member 15 is interposed between the two prong portions of each of the forked connecting portions 31 and 32. The connecting portion 31, provided at the end of the upper link 21, is pivotably attached to the saddle mounting member 15 by using the pin 23, which is employed in the second embodiment, while the connecting portion 32, provided at the end of the lower link 22, is connected to the saddle mounting member 15 by using the pin (second pin) 19 in common, which is inserted into the elongated bore (pin bore) 18a in the bracket 18 of the damper casing 7 to connect the bracket 18 and the saddle mounting member 15.

In the third embodiment, arranged as described above, the pin 19, which is used for connecting the saddle mounting member 15 and the bracket 18 of the damper casing 7, is also used as a pivot point (arthrosis point) of the parallelogram link mechanism 24. Therefore, the number of pin insertion bores provided in the saddle mounting member 15 becomes smaller than that in the second embodiment by one, and the play in the saddle mounting member 15 due to machining and assembling errors can be correspondingly reduced. Therefore, the ride quality is further improved. Moreover, it is possible to simplify the configuration of the saddle mounting member 15, and hence reduce the production cost.

Although in the foregoing three embodiments a gas-filled hydraulic damper is employed as a combination of a tubular support member and a spring means, it should be noted that any type of spring means may be employed as desired for example, damper in which a gas alone is sealed without using oil, or a damper in which the sealed gas is replaced with a metallic spring, e.g., a coil spring, with the oil left as it is or without using oil.

It is possible to use the metallic spring jointly with the above-described gas, as a matter of course. Further, the damping force generating mechanism of the damper, which is employed in the foregoing embodiments, is not necessarily limitative. For example, the orifice in the described damping force generating mechanism may be replaced with a disk valve mechanism, which is often used in shock absorbers.

Furthermore, it will be appreciated that the function of the casing 7 is to resiliently support the saddle for a limited movement in the axial direction of the casing for shock absorbing. Therefore, the damper may be replaced with a combination of any suitable tubular member having no piston and rod, and a spring disposed between the tubular member and the cap 6.

As has been detailed above, the saddle supporting device of the present invention allows external force to be applied only in a direction substantially parallel to the axis of the casing or tubular support member. Therefore, there is no likelihood of sticking occurring at the area of sliding contact between the tubular support member and the guide tube. Accordingly, the action of the tubular support member is stabilized. In addition, since relative rotation between the guide tube and the tubular support member is prevented by the cooperation of the bearing arm and either the swing arm or the two links, it becomes unnecessary to provide a special rotation preventing means in the guide tube. Accordingly, it is possible not only to simplify the structure, but also to reduce the cost. If the parallelogram link mechanism is provided, the saddle is maintained in a predetermined posture without rotating. Accordingly, the saddle supporting device of the present invention is superior in terms of safety as well as ride quality.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A device for supporting a saddle on a support frame post of a support frame of a vehicle, comprising:
   a guide tube adapted to be inserted in and secured to the support frame post so that one end of said guide tube extends from the support frame post;
   a tubular support member mounted for axial sliding movement in said guide tube;
   a spring arrangement resiliently supporting said tubular support member in said guide tube so that one end of said tubular support member extends from said guide tube;
   a saddle mounting member connected to said one end of said tubular support member by a connection permitting a limited amount of relative movement between said saddle mounting member and said tubular support member in a longitudinal direction transverse to the axis of said tubular support member;
   a bearing arm integral with said one end of said guide tube and extending in the longitudinal direction; and
   two parallel links, each said parallel link having opposite ends pivotally connected at points of pivotal connection to a forward portion of said bearing arm and said saddle mounting member, respectively, wherein a line connecting the points of pivotal connection between said two parallel links and the forward portion of said bearing arm and a line connecting the points of pivotal connection between said two parallel links and said saddle mounting member are generally parallel with the axis of said tubular support member so as to form a parallelogram link mechanism.

2. The device of claim 1, wherein said line connecting the points of pivotal connection between said two parallel links and said saddle mounting member is aligned with the axis of said tubular support member, and a common connection connects saddle mounting member to said end of said tubular support member and said saddle mounting member to a said end of one of said two parallel links.

3. The device of claim 2, wherein said tubular support member and said spring arrangement together comprise:
   a cylinder defining a casing;
   a piston slidably disposed of said casing;
   a piston rod extending out of said casing having one end connected to said guide tube; and
   compressed gas sealed in said casing.

4. The device of claim 3, and further comprising a damping force generating mechanism that generates a damping force upon sliding movement of said tubular support member relative to said guide tube.

5. The device of claim 2, wherein said common connection includes a pin engaging each of said one end of said tubular member, said saddle mounting member and the said end of one of said two parallel links.

6. The device of claim 2, and further comprising a damping force generating mechanism that generates a damping force upon sliding movement of said tubular support member relative to said guide tube.

7. The device of claim 1, wherein said tubular support member and said spring arrangement together comprise:
   a cylinder defining a casing;
   a piston slidably disposed in said casing;
   a piston rod extending out of said casing having one end connected to said guide tube; and
   compressed gas sealed in said casing.

8. The device of claim 7, and further comprising a damping force generating mechanism that generates a damping force upon sliding movement of said tubular support member relative to said guide tube.

9. The device of claim 7, wherein said guide tube has an opposite end opposite to said one end and a cap fixed to said opposite end, said piston rod being connected to said guide tube by being fixed to said cap.

10. The device of claim 1, and further comprising a damping force generating mechanism that generates a damping force upon sliding movement of said tubular support member relative to said guide tube.

11. The device of claim 1, wherein said tubular support member and said spring arrangement together comprise:
   a cylinder defining a casing;
   a piston slidably disposed in said casing;
   a piston rod extending out of said casing, said piston being fixed to a cap on an opposite end of said guide tube opposite to said one end.

* * * * *